(12) United States Patent
Zhao (10) Patent No.: US 10,261,258 B1
(45) Date of Patent: Apr. 16, 2019

(54) SIMPLE AND AUTOMATIC FIBER CLEAVER

(71) Applicant: INNO INSTRUMENT (CHINA) .INC, WeiHai (CN)

(72) Inventor: Yangri Zhao, WeiHai (CN)

(73) Assignee: INNO INSTRUMENT (CHINA) .INC, Weihai (CN)

( * ) Notice: Subject to any disclaimer, the term of this patent is extended or adjusted under 35 U.S.C. 154(b) by 0 days.

(21) Appl. No.: 15/988,230

(22) Filed: May 24, 2018

(30) Foreign Application Priority Data

Dec. 29, 2017 (CN) .......................... 2017 1 1483310

(51) Int. Cl.
G02B 6/25 (2006.01)
B24B 19/22 (2006.01)
G02B 6/36 (2006.01)

(52) U.S. Cl.
CPC ............. *G02B 6/25* (2013.01); *G02B 6/3636* (2013.01); *B24B 19/226* (2013.01)

(58) Field of Classification Search
CPC .................................................. B24B 19/226
See application file for complete search history.

(56) References Cited

U.S. PATENT DOCUMENTS

| | | | | |
|---|---|---|---|---|
| 6,801,705 B2* | 10/2004 | Sasaki | ...................... | G02B 6/25 225/93 |
| 7,896,208 B2* | 3/2011 | Bottcher | .................. | G02B 6/25 225/1 |
| 9,435,954 B2* | 9/2016 | Zhao | ........................ | B26D 5/08 |
| 9,726,823 B2* | 8/2017 | Zhao | ........................ | G02B 6/25 |
| 2003/0077062 A1* | 4/2003 | Sasaki | ...................... | G02B 6/25 385/134 |
| 2005/0169594 A1* | 8/2005 | Song | ........................ | B26D 1/18 385/134 |
| 2015/0128779 A1* | 5/2015 | Zhao | ....................... | B26D 5/08 83/82 |

FOREIGN PATENT DOCUMENTS

CN 202837588 U 3/2013

* cited by examiner

*Primary Examiner* — Rhonda S Peace
(74) *Attorney, Agent, or Firm* — Anova Law Group, PLLC (57) ABSTRACT

A simple and automatic fiber cleaver, comprises an upper cover and a base, wherein the upper cover and the base are pivotally connected through a rotating shaft; the base comprises a framework moving space and a guide rail framework; the guide rail framework moves in the framework moving space and cuts fibers in the moving process; the guide rail framework comprises a positioning pin and an elastic device; the positioning pin is embedded and movably connected with the guide rail framework; one end of the elastic device is fixedly connected with the positioning pin; and the other end of the elastic device is fixedly connected with the guide rail framework; and the elastic device can drive the positioning pin to move up and down and clamp into the base or release from the base; the guide rail framework and the base respectively comprise magnetic devices with the same magnetism and/or different magnetism, and the attraction or repulsion action of the magnetic devices causes the guide rail framework to move and cut fibers in the moving process.

7 Claims, 6 Drawing Sheets

SIMPLE AND AUTOMATIC FIBER CLEAVER

CROSS-REFERENCE TO RELATED APPLICATIONS

This application claims the priority of Chinese Patent Application No. CN201711483310.3, filed on Dec. 29, 2017, the content of which is incorporated herein by reference in its entirety.

TECHNICAL FIELD

The present invention relates to the field of optical fiber cutting equipment, and in particular, to a simple and automatic fiber cleaver.

BACKGROUND

A fiber cleaver is a device for cleaving optical fibers. Usually it comprises an upper cover and a base, wherein the base is provided with a guide rail framework capable of moving back and forth; a blade is arranged in the guide rail framework; during cleaving, the fibers to be cut are horizontally placed and perpendicular to the direction that the guide rail framework moves back and forth, to cause the guide rail framework to move, and the blade passes through the fibers to be cut and forms a notch on the fibers, so that the fibers are cut off. Patent CN201220240985.1 discloses a fiber cleaver which has a carrying case, main body, and a movable unit with a blade member, and the movable unit with a blade member comprises a blade holder and a blade member mounted to the blade holder and forming a scratch on a glass fiber portion of the fiber, and the movable unit with the blade member is provided on the main body. Among others, the main body utilizes the movement of the blade holder to move the blade holder from the cleaving preparation position to the initial position by the elastic force of the spring, however, the force of the bounce is unstable when the spring is used for the cleaver, and the force of the spring is attenuated along with the increase of the service life, so that the end face of the fiber is easy to be cut unevenly, resulting in cleaving failure, and the fiber needs to be reprepared and recleaved. This reduces the utilization rate of the fiber and causes waste of the fiber, thereby increasing the cost, reducing the production efficiency and bringing a lot of inconvenience to the operator.

SUMMARY

The invention provides a simple and automatic fiber cleaver, which aims to solve the problem of unevenness of the fiber cleaving section caused by unstable force application in the fiber cleaving process of the fiber cleaver in the background art.

In order to solve the above problems, the present invention provides the following technical scheme:
- a simple and automatic fiber cleaver comprising an upper cover and a base, and the upper cover and the base are pivotally connected through a rotating shaft; the base comprises a framework moving space and a guide rail framework; the guide rail framework moves in the framework moving space and cuts fibers in the moving process, wherein,
- the guide rail framework comprises a positioning pin and an elastic device; the positioning pin is embedded and movably connected with the guide rail framework; one end of the elastic device is fixedly connected with the positioning pin; and the other end of the elastic device is fixedly connected with the guide rail framework; and the elastic device can drive the positioning pin to move up and down and clamp into the base or release from the base;
- the upper cover comprises a compression rod which is fixedly connected with the upper cover; when the upper cover is open, the compression rod does not contact with the positioning pin, and the positioning pin is clamped into the base; when the upper cover is closed, the compression rod contacts with the positioning pin and presses down the positioning pin, and the positioning pin is released from the base;
- the guide rail framework and the base respectively comprise magnetic devices with the same magnetism and/or different magnetism, and the attraction or repulsion action of the magnetic devices causes the guide rail framework to move and cut fibers in the moving process.

Preferably, the magnetic devices comprise at least two, with one comprising a first magnet and a second magnet, and the other comprising a third magnet and a fourth magnet, wherein the first magnet is arranged at the rear end of the base, the second magnet is arranged on the surface of the guide rail framework opposite to the front surface of the rear end of the base, and the first magnet and the second magnet have the same magnetism; the fourth magnet is arranged at the front end of the base, the third magnet is arranged on the surface of the guide rail framework opposite to the front surface of the front end of the base, and the third magnet is different from the fourth magnet in magnetic property.

Preferably, the moving distance of the guide rail framework is controlled by the first magnet, the second magnet, the third magnet and the fourth magnet together, the moving distance control of the guide rail framework is divided into two sections, the first section of the moving distance is controlled by the first magnet and the second magnet, the second section of the moving distance is controlled by the third magnet and the fourth magnet, and the fiber cleaving action of the guide rail framework occurs in the first section of the moving distance.

Preferably, the guide rail framework comprises a projection, which is perpendicular to the moving direction of the guide rail framework, and the third magnet is arranged on the projection.

Preferably, the magnetic induction density of each of the first magnet, the second magnet, the third magnet and the fourth magnet ranges from 2,000 Gs to 10,000 Gs.

Preferably, the simple and automatic fiber cleaver further comprises a limiting device, and the limiting device comprises a stopper, the upper cover is provided with a groove, and the stopper moves on the base, to insert into the groove or release from the groove, so that the upper cover is in a closed state or is released from the closed state.

Preferably, the limiting device further comprises a limiting key which is fixedly connected with the stopper, and a plurality of flanges are arranged on the limiting key.

Due to the adoption of the above-mentioned technical scheme, the beneficial effects of the present invention are: to effectively control and balance the strength and speed to cut fibers, enabling the cleaver to cut the fiber with stable force, optimize the flatness of the fiber cleaving end face, improve the fiber cleaving quality thus to improve the production efficiency.

DETAILED DESCRIPTION OF EMBODIMENTS

Hereinafter, the present invention will be described further with reference to the accompanying drawings.

Referring to FIGS. 1 through 6, a simple and automatic fiber cleaver comprises an upper cover 1 and a base 2, wherein one end of the connection between the upper cover 1 and the base 2 is provided with a rotating shaft through hole through which a rotating shaft 8 passes, the rotating shaft 8 passes through the rotating shaft through hole to connect the upper cover 1 and the base 2, and the upper cover 1 can be rotated through the rotating shaft 8 to open and close the upper cover 1. Preferably, a torsion spring 81 is provided on the inner side of the connection between the upper cover 1 and the base 2, and the direction of the spring tension of the torsion spring 81 is: to keep the upper cover 1 away from the base 2, i.e. in the normal operating state, the upper cover of the cleaver in the initial position is in the open state. At the same time, in order to avoid an excessive opening angle, a projection 22 is provided on the upper surface of the base 2, and an upper cover end 13 is provided at the rear end of the upper cover 1. When the upper cover 1 is open to a certain angle, the upper cover end 13 touches the projection 22 to fix the maximum opening angle of the upper cover 1. The upper cover 1 further comprises a compression rod 11 positioned on the inner surface of the upper cover and a groove 12 positioned at the rear part of the upper cover and close to the rotating shaft 8, wherein the compression rod 11 is fixedly connected with the upper cover 1 in an embedded manner.

The base 2 comprises a framework moving space 3 and a guide rail framework 4, a clamp 7 and a through hole 21, wherein the guide rail framework 4 reciprocates in the framework moving space 3 and can cut fibers during movement. The guide rail framework 4 comprises a positioning pin 41, an elastic device 42, a projection 44, a recess 45 and a hand pushing portion 46, the recess 45 being arranged in a cylindrical shape, preferably the recess 45 comprising a recess wide part 451 and a recess neck part 452. The positioning pin 41 is embedded and installed in the recess 45. Preferably, the positioning pin 41 includes a positioning pin neck part 411, a positioning pin ear part 412, and a positioning pin tail part 413. The outer edge of the positioning pin ear part 412 is wider than the positioning pin neck part 411 and also wider than the positioning pin tail part 413. After installation, due to the limitation of the positioning pin ear part 412, the part under the ear of the positioning pin 41 is caught in the recess wide part 451 and can move up and down in the recess wide part 451. End A of the elastic device 42 is fixedly connected with the positioning pin 41, specifically, the end A of the elastic device 42 is sleeved on the positioning pin tail part 413, and the end B is connected with the guide rail framework 4, and specifically, is fixedly connected with the bottom surface of the recess 45. The elastic device 42 can be elastically deformed so as to drive the positioning pin 41 to move up and down, and when the upper cover 1 is open, the compression rod 11 does not contact the positioning pin 41. At this time, the elastic device 42 is in a released state, and the positioning pin 41 is lifted up and stuck into the through hole 21 on the upper surface of the base 2 from the recess 45, so that the guide rail framework 4 can be fixed in the advancing state; when the upper cover 1 is closed, the compression rod 11 is pressed down into the upper surface through hole 21 of the base 2, further pressed down into contact with the positioning pin 41 to press down the positioning pin 41, so that the elastic device 42 is in a pressed state, at which time the positioning pin 41 is separated from the base 2, so that the guide rail framework 4 is released from the advancing state to the withdrawing state (initial state position), and the optical fiber is cut while the state is changed. Preferably, the elastic device 42 may be a spring.

The guide rail framework 4 and the base 2 are provided with a magnetic device 43 and preferably, the magnetic device 43 is 2, comprising a first magnetic device 431 and a second magnetic device 432, wherein, the first magnetic device 431 comprises a first magnet 4311 and a second magnet 4312, and the second magnetic device 432 comprises a third magnet 4321 and a fourth magnet 4322, wherein the first magnet 4311 and the third magnet 4321 are fixedly mounted on the base 2 and the second magnet 4312 and the third magnet 4321 are fixedly mounted on the guide rail framework 4. Preferably, the first magnet 4311 is fixedly mounted to the rear end of the base 2, i.e., close to one end of the rotating shaft 8 at the connection between the upper cover 1 and the base 2, and the second magnet 4312 is fixedly mounted to the surface of the guide rail framework 4 opposite to the front surface of the rear end of the base 2, i.e., on the side of the guide rail framework 4 remote from the hand pushing portion 46. Preferably, the first magnet 4322 is fixedly mounted to the rear end of the base 2, i.e., close to one end of the rotating shaft 8 at the connection between the upper cover 1 and the base 2, and the second magnet 4321 is fixedly mounted to the surface of the guide rail framework 4 opposite to the front surface of the rear end of the base 2, i.e., on the side of the guide rail framework 4 remote from the hand pushing portion 46. When the positioning pin 41 is separated from the base 2, the guide rail framework 4 is moved to the pull-out state under the combined action of the repulsive force of the first magnet 4311 and the second magnet 4312 and the attractive force of the third magnet 4321 and the fourth magnet 4322, and when the third magnet 4321 and the fourth magnet 4322 come into contact with each other, the guide rail framework 4 returns to the maximum pull-out state, that is, the initial state. That is, the moving distance of the guide rail framework 4 is controlled by the first magnet 4311, the second magnet 4312, the third magnet 4321, and the fourth magnet 4322 together, and it is easy to understand that the moving distance of the guide rail framework 4 can be divided into two sections, the first section being controlled by the first magnet 4311 and the second magnet 4312, and the second section being controlled by the third magnet 4321 and the fourth magnet 4322. First, when the upper cover 1 is closed and touches the positioning pin 41 to separate from the base 2, and no longer restricts the returning movement of the guide rail framework, the guide rail framework 4 moves towards the initial state direction due to the repulsive action of the first magnet 4311 and the second magnet 4312, and in the process, the blade on the guide rail framework 4 cuts the fiber. In order to maintain the uniform force during fiber cleaving, the magnetic induction density of each of the first magnet 4311 and the second magnet 4312 is set between 2,000 Gs and 10,000 Gs (Gs: gauss, is a unit of magnetic induction density, a wire, sitting in a magnetic field of uniform magnetic induction density, when a long and straight wire with the direction perpendicular to that of the magnetic induction density carries a constant current of 1 abampere experiences a force of 1 dyne, the magnetic induction density is defined as 1 gauss), so that the force from the magnetic device is stable, and the cleaved surface of the fiber will not deviate due to too fast force application. At the same time, in order to make the force of the whole moving distance uniform and continuous, we set up a second moving distance controlled by the third magnet 4321 and the fourth magnet 4322, and when the first section of the moving distance is near the end and the magnetic force is about to decrease, the force of the third magnet 4321 and the fourth magnet 4322 which are different in magnetism starts to exert, so that the moving distance of the guide rail framework 4 continues and returns to the initial state. The magnetic induction density of each of the third magnet 4321 and the fourth magnet 4322 is set between 2,000 Gs and 10,000 Gs. Therefore, the magnetic devices are respectively arranged at the rear end and the front end of the base, so that the whole moving distance of the guide rail framework 4 is jointly completed by transferring the repulsive force with the same magnetism to the attractive force with different magnetism, and the moving stability of the guide rail framework 4 is ensured. Preferably, the present invention relates to two magnetic devices, but is not limited to two magnetic devices, and any application of magnetic devices as traction force should fall within the scope of the present invention.

Figure 1:
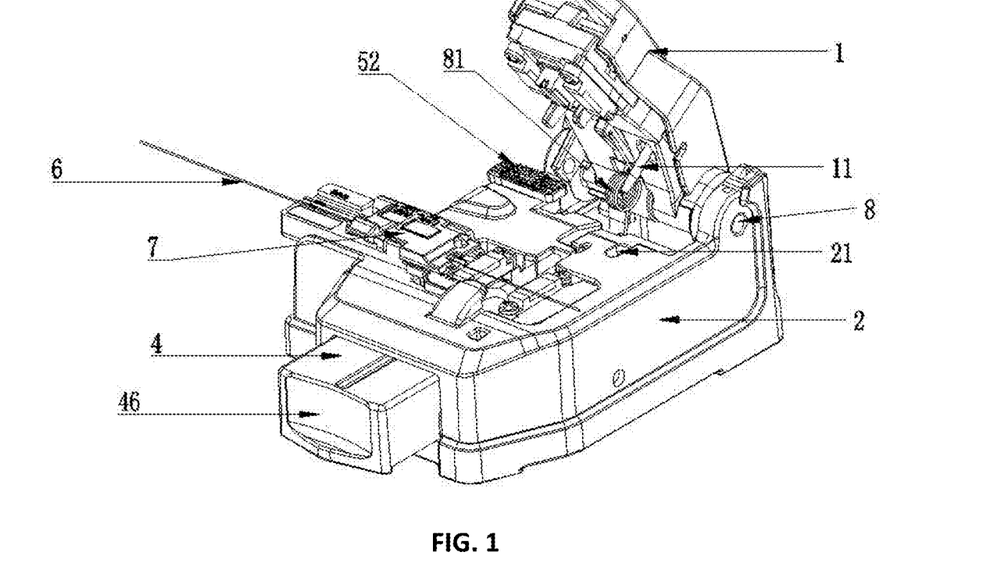
FIG. 1 is a schematic diagram of the overall structure of a simple and automatic fiber cleaver according to the present invention.
Figure 2:
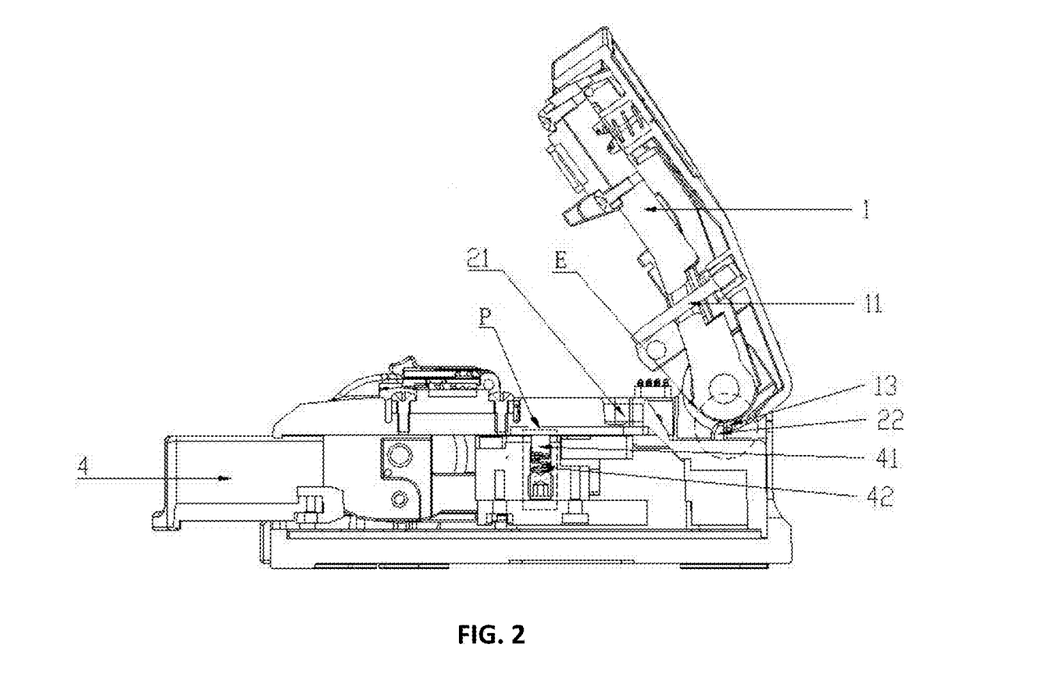
FIG. 2 is a schematic diagram of the structure of a simple and automatic fiber cleaver under the initial state according to the present invention.
Figure 3:
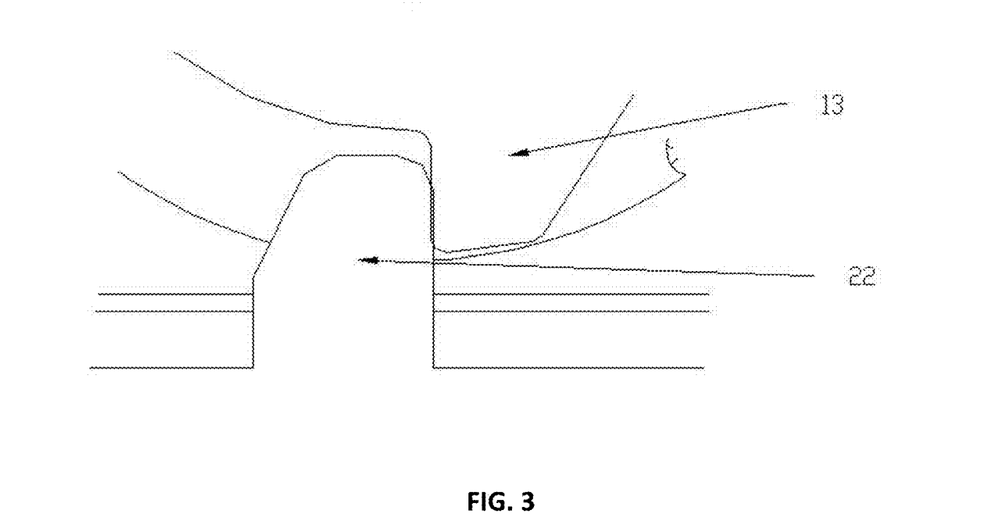
FIG. 3 is the close-up view of section E as shown in FIG. 2.
Figure 4:
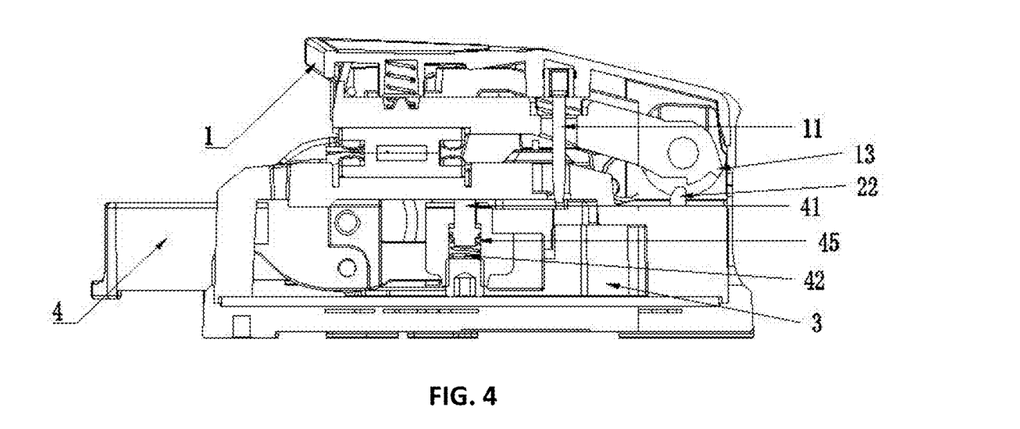
FIG. 4 is an exploded view of the structure of a simple and automatic fiber cleaver when the fiber cleaving state is finished according to the present invention.
Figure 5:
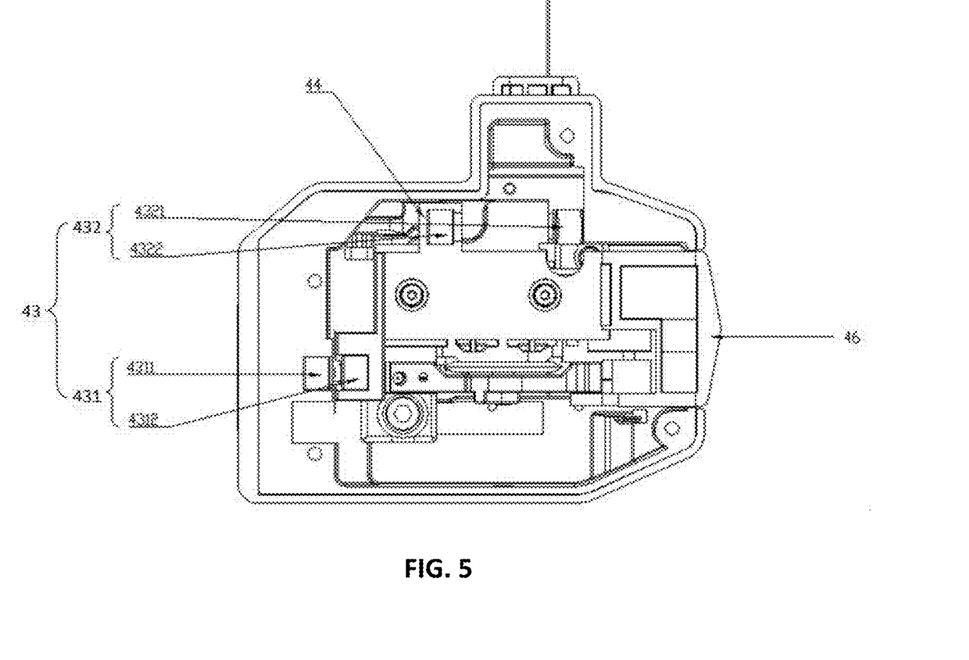
FIG. 5 is a schematic diagram of the magnet position of a simple and automatic fiber cleaver according to the present invention.
Figure 6:
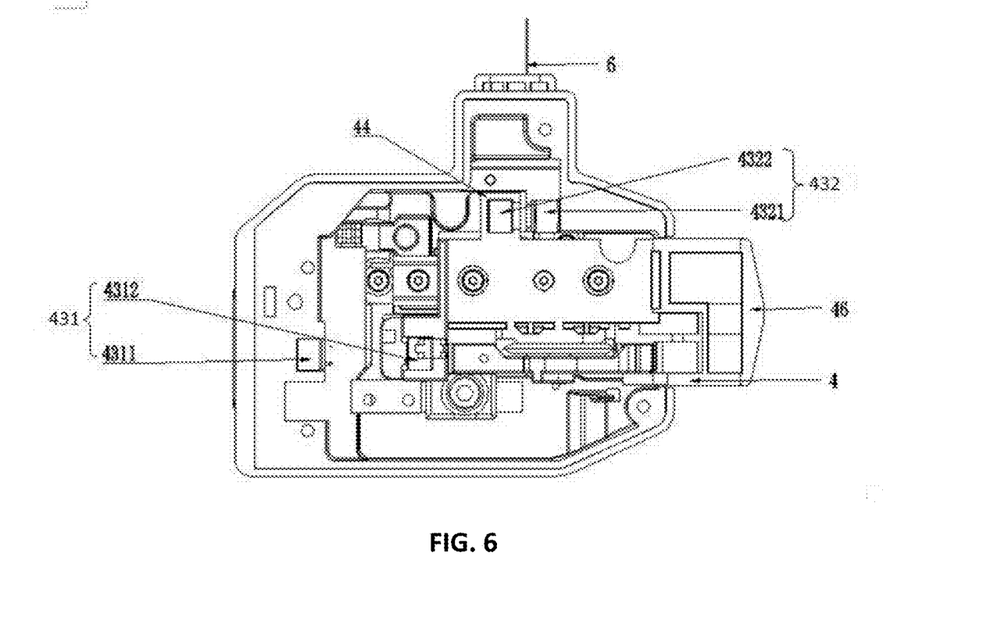
FIG. 6 is a schematic diagram of the bottom structure of a simple and automatic fiber cleaver according to the present invention.
Figure 7:
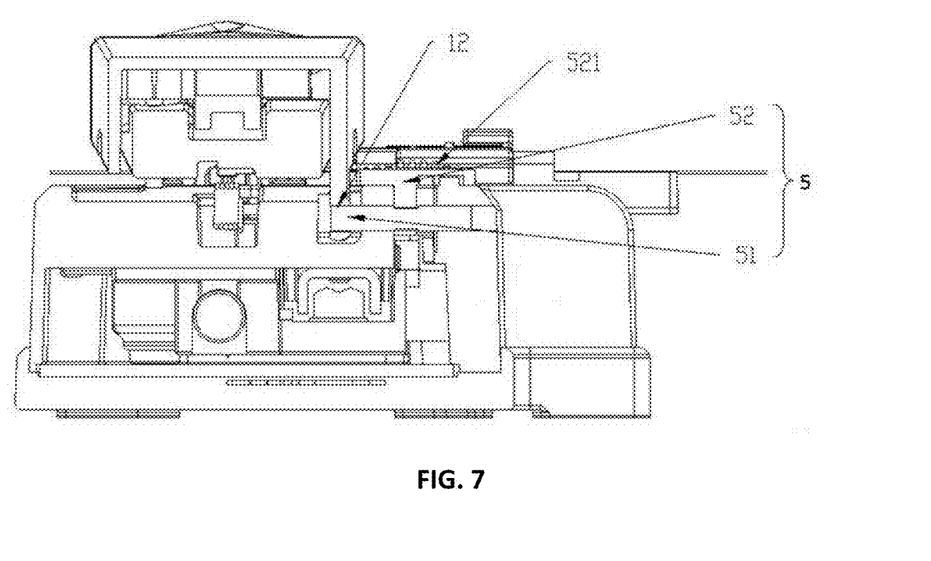
FIG. 7 is a schematic diagram of the limiting structure under closed state of a simple and automatic fiber cleaver according to the present invention.
Figure 8:
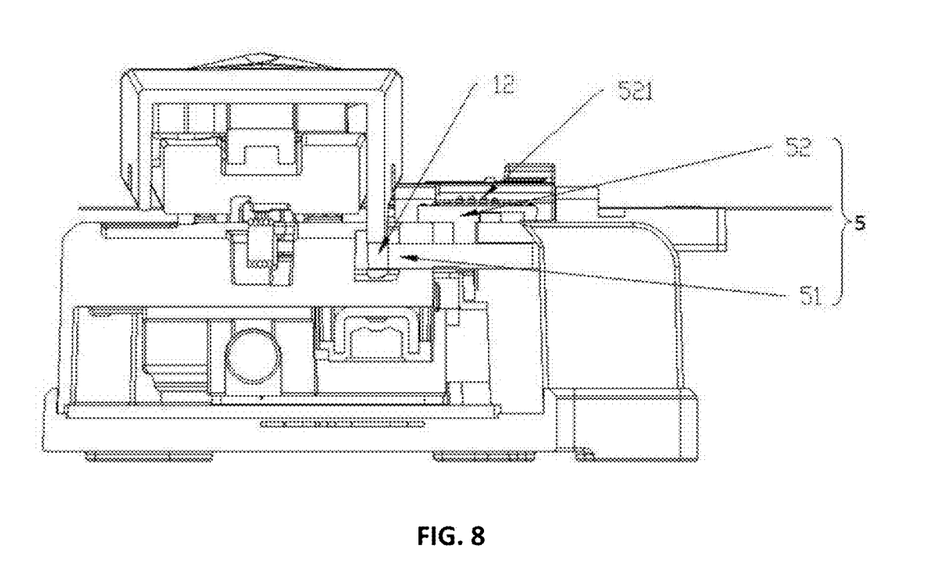
FIG. 8 is a schematic diagram of the limiting structure under open state of a simple and automatic fiber cleaver according to the present invention.
Figure 9:
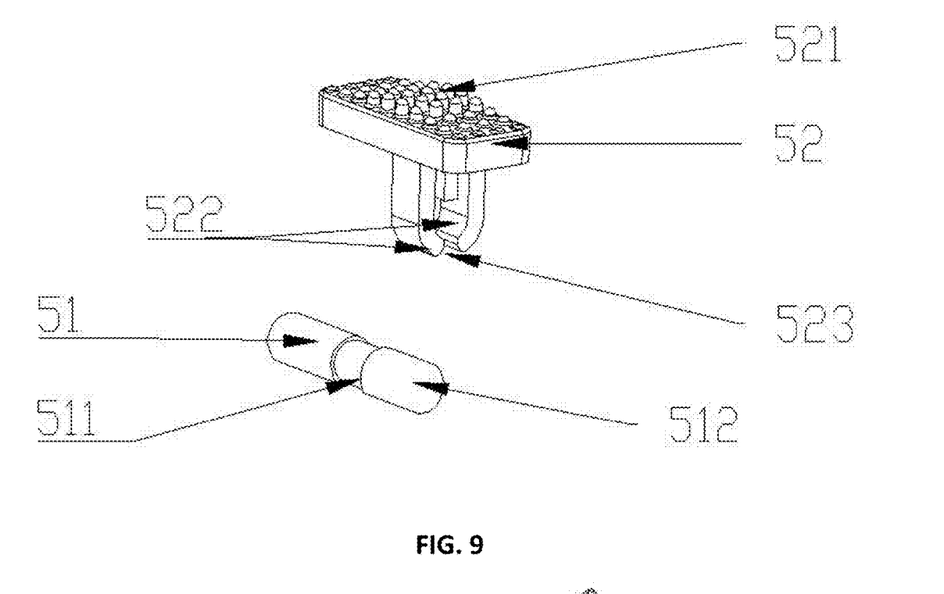
FIG. 9 is an exploded supplementary schematic diagram of the limiting structure of a simple automatic optical fiber cutter according to the present invention.
Figure 10:
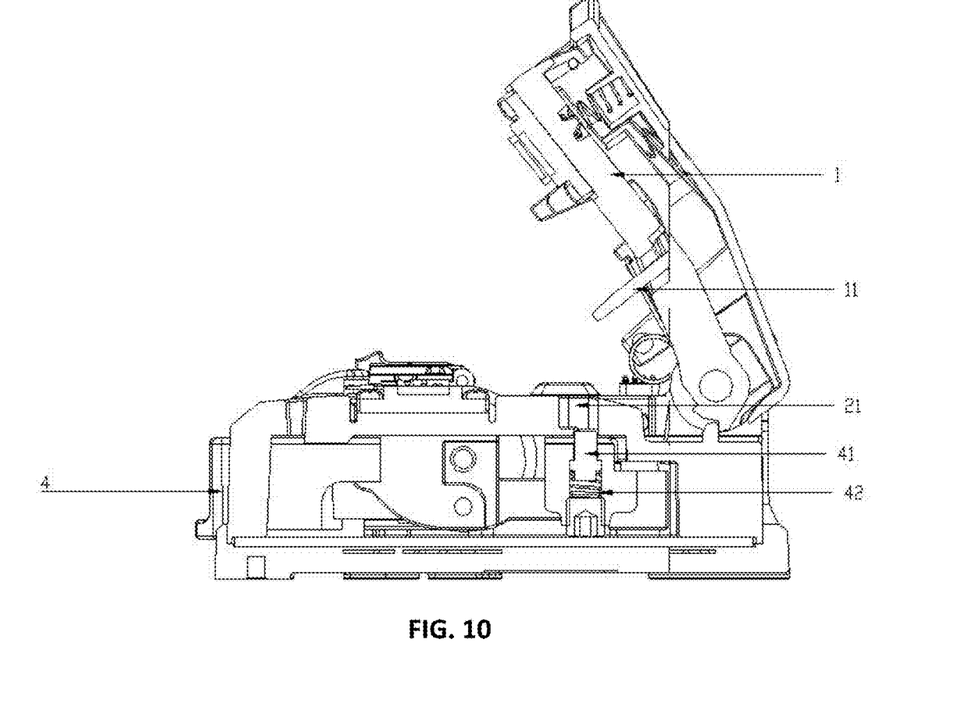
FIG. 10 is a schematic diagram of the operating state of a simple and automatic fiber cleaver according to the present invention.
Figure 11:
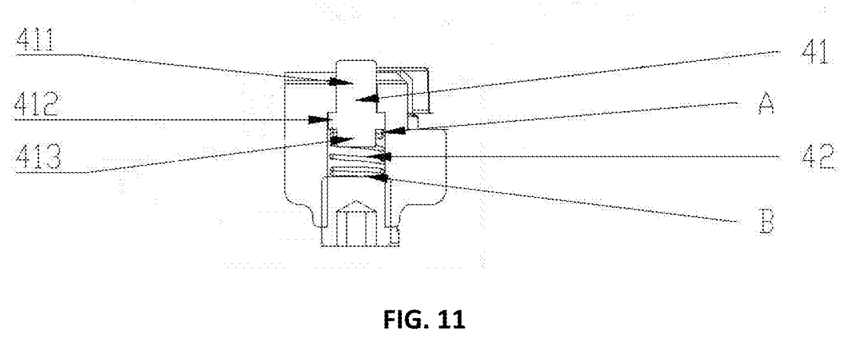
FIG. 11 is the close-up view of section P as shown in FIG. 2.
Figure 12:
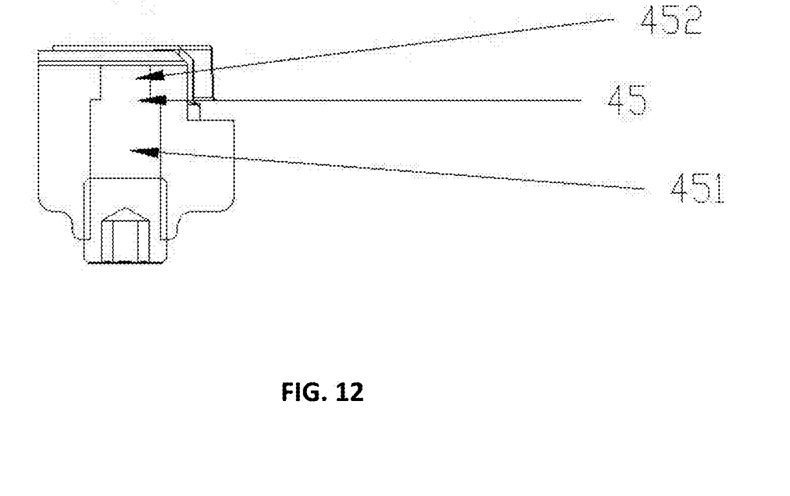
FIG. 12 is a structural schematic diagram of the recess of the structure as shown in FIG. 11.

Referring to FIGS. 7 through 9, a simple and automatic fiber cleaver further comprises a limiting device 5 movably arranged on the base 2, wherein the limiting device 5 comprises a stopper 51 and a limiting key 52; preferably, the stopper 51 and the limiting key 52 are separately arranged; the upper part of the stopper 51 is fixedly connected with the limiting key 52; and the limiting key 52 can drive the stopper 51 to move together. Specifically, the stopper 51 is provided with a fastening part 511 and a connecting part 512, wherein, the connecting part 512 is slightly thicker than the fastening part 511, and the limiting key 52 is provided with a buckle 522, which is arranged symmetrically and separately left and right, the width of the gap 523 existing in the middle is slightly smaller than the diameter of the fastening part 511, and preferably, the buckle 522 is made of plastic material, when the stopper 51 is connected with the limiting key 52, the plastic material of the buckle 522 can be elastically deformed, so that the width of the gap 523 is increased to be the same as the diameter of the fastening part 511, and therefore, the fastening part 511 can be clamped with the buckle 522 through the gap 523. The stopper 51 is embedded in the base 2 and can move back and forth in the base 2. When the connecting part 512 is inserted into the groove 12, the upper cover 1 cannot be opened because the connecting part 512 blocks the rotation path of the opening movement of the upper cover 1, and is in a closed state. When the connecting part 512 is separated from the groove 12, the path obstacle of the opening movement of the upper cover 1 is removed, and the upper cover is in an open state. The limiting key 52 is provided with a flange 521 for increasing the friction force between the fingers of the operator and the key during use and facilitating the movement of the stopper 51.

The operating principle of the fiber cleaver of the present invention will be explained in steps, taking different states of the fiber cleaver during operation as an example.

(Cleaver in an Initial State)

When the cleaver is in the initial state, the upper cover 1 is in the open state and the hand pushing portion 46 is in the state of being exposed to the outside of the base 2 to the maximum extent, the elastic device 42 on the guide rail framework 4 is in the pressed state, the positioning pin 41 is in the recess 45, the top of the positioning pin 41 abuts against the inner side of the upper surface of the base 2, the first magnet 4311 and the second magnet 4312 are in the state of being furthest away and the repulsive force is weakest, and the third magnet 4321 and the fourth magnet 4322 are in the state of being most attractive, attractive to each other and in contact with each other. Since the upper cover 1 is open, the compression rod 11 is not in contact with the positioning pin 41 at this time.

(Cleaver in Preparatory Work State before Fiber Cleaving)

Referring to FIGS. 1 through 6, when the cleaver is ready to cut the fiber, it touches the hand pushing portion 46 to push the guide rail framework 4 toward the rear end of the base 2 along the framework moving space 3. At this time, since a through hole 21 exists in the base 2, when the positioning pin 41 is pushed to the through hole 21, the top of the positioning pin 41 is no longer blocked by the upper surface of the base 2. Due to the elastic action of the elastic device 42 (the elastic device 42 changes from the compressed state to the released state here), the positioning pin 41 is displaced upward and caught in the through hole 21, and due to the restriction of the positioning pin ear part 422, the positioning pin 41 is at the highest point of upward displacement and the guide rail framework 4 is fixed by the positioning pin 41. At this time, the first magnet 4311 and the second magnet 4312 are in a state where the repulsive force is the strongest and the distance is the smallest and in contact with each other, while the third magnet 4321 and the fourth magnet 4322 are in a state where the attractive force is the smallest and the distance is the longest. The upper cover 1 is still in an open state.

(Fiber Cleaving State)

Referring to FIGS. 1 through 6, when the above steps are completed, the fiber 6 is placed in the jig 7 to be cut. When the fiber cleaving is started, the upper cover 1 is closed, the compression rod 11 just penetrates into the through hole 21, contacts with the positioning pin 41 and exerts downward pressure, and the positioning pin 41 is displaced downward due to the pressure of the compression rod 11, so that the elastic device 42 returns to the compressed state from the released state, so that the positioning pin 41 leaves the through hole 21 and returns to the recess 45, the guide rail framework 4 lacks of positioning by the positioning pin 41, and under the repulsive force of the first magnet 4311 and the second magnet 4312, and the attractive force of the third magnet 4321 and the fourth magnet 4322, causing the guide rail framework 4 to rebound from the advancing position to the maximum extent to the exposed position to the maximum position, and cut the fiber 6.

(The Upper Cover of the Cleaver is Open and Returns to the Initial Position)

Referring to FIGS. 1 through 6, after the fiber is cleaved, the upper cover 1 is open and the compression rod 11 is moved away from the through hole 21 to return to the initial state as to make preparation for the next fiber cleaving.

The above disclosure is only specific embodiments of the present invention, which are used to more clearly illustrate the present invention and are not intended to limit the invention, and variations that anyone skilled in the art can think of should fall within the scope of the present invention.

What is claimed is:

1. A simple and automatic fiber cleaver, comprising:
an upper cover and a base, wherein:
the upper cover and the base are pivotally connected through a rotating shaft;
the base comprises a framework moving space and a guide rail framework, and the guide rail framework moves in the framework moving space and cuts fibers in the moving process;
the guide rail framework comprises a positioning pin and an elastic device; the positioning pin is embedded and movably connected with the guide rail framework; one end of the elastic device is fixedly connected with the positioning pin; and the other end of the elastic device is fixedly connected with the guide rail framework; and the elastic device can drive the positioning pin to move up and down and clamp into the base or release from the base;
the upper cover comprises a compression rod which is fixedly connected with the upper cover; when the upper cover is open, the compression rod does not contact with the positioning pin, and the positioning pin is clamped into the base; when the upper cover is closed, the compression rod contacts with the positioning pin and presses down the positioning pin, and the positioning pin is released from the base;
the guide rail framework and the base respectively comprise magnetic devices with the same magnetism and/or different magnetism, and the attraction or repulsion action of the magnetic devices causes the guide rail framework to move and cut fibers in the moving process;
wherein the magnetic devices comprise at least two, with one comprising a first magnet and a second magnet, and the other comprising a third magnet and a fourth magnet, wherein the first magnet is arranged at the rear end of the base, the second magnet is arranged on the surface of the guide rail framework opposite to the front surface of the rear end of the base, and the first magnet and the second magnet have the same magnetism; the fourth magnet is arranged at the front end of the base, the third magnet is arranged on the surface of the guide rail framework opposite to the front surface of the front end of the base, and the third magnet is different from the fourth magnet in magnetic property.

2. The simple and automatic fiber cleaver according to claim 1, wherein:
the moving distance of the guide rail framework is controlled by the first magnet, the second magnet, the third magnet and the fourth magnet together, the moving distance control of the guide rail framework is divided into two sections, the first section of the moving distance is controlled by the first magnet and the second magnet, the second section of the moving distance is controlled by the third magnet and the fourth magnet, and the fiber cleaving action of the guide rail framework occurs in the first section of the moving distance.

3. The simple and automatic fiber cleaver according to claim 2, wherein the magnetic induction density of each of the first magnet, the second magnet, the third magnet and the fourth magnet ranges from 2,000 Gs to 10,000 Gs.

4. The simple and automatic fiber cleaver according to claim 1, wherein the guide rail framework comprises a projection, which is perpendicular to the moving direction of the guide rail framework, and the third magnet is arranged on the projection.

5. The simple and automatic fiber cleaver according to claim 1, wherein the base is provided with a limiting device, and the limiting device comprises a stopper, the upper cover is provided with a groove, and the stopper moves on the base, to insert into the groove or release from the groove, so that the upper cover is in a closed state or is released from the closed state.

6. The simple and automatic fiber cleaver according to claim 5, where the limiting device further comprises a limiting key which is fixedly connected with the stopper, and a plurality of flanges are arranged on the limiting key.

7. A simple and automatic fiber cleaver, comprising:
an upper cover and a base, wherein:
the upper cover and the base are pivotally connected through a rotating shaft;
the base comprises a framework moving space and a guide rail framework, and the guide rail framework moves in the framework moving space and cuts fibers in the moving process;
the guide rail framework comprises a positioning pin and an elastic device; the positioning pin is embedded and movably connected with the guide rail framework; one end of the elastic device is fixedly connected with the positioning pin; and the other end of the elastic device is fixedly connected with the guide rail framework; and the elastic device can drive the positioning pin to move up and down and clamp into the base or release from the base;
the upper cover comprises a compression rod which is fixedly connected with the upper cover; when the upper cover is open, the compression rod does not contact with the positioning pin, and the positioning pin is clamped into the base; when the upper cover is closed, the compression rod contacts with the positioning pin and presses down the positioning pin, and the positioning pin is released from the base;
the guide rail framework and the base respectively comprise magnetic devices with the same magnetism and/or different magnetism, and the attraction or repulsion action of the magnetic devices causes the guide rail framework to move and cut fibers in the moving process;
wherein the guide rail framework is provided with a recess, and the recess comprises a recess wide part and a recess neck part; the positioning pin comprises a positioning pin neck part, a positioning pin ear part and a positioning pin tail part, wherein the positioning pin ear part and the positioning pin tail part are embedded and installed in the recess wide part; the positioning pin neck part is positioned in the recess neck part; the positioning pin tail part is fixedly connected with the elastic device; and the positioning pin ear part is wider than the recess neck part, so that the positioning pin ear part and the positioning pin tail part can only move in the recess wide part; when the upper cover is closed, the positioning pin sinks, and all or part of the positioning pin neck part is embedded in the recess wide part, and when the upper cover is open, the positioning pin rises, and the positioning pin neck part is embedded in the recess neck part.

\* \* \* \* \*